Sept. 2, 1941.     M. C. OVERMAN     2,254,622
METHOD FOR FORMING TIRES WITH RIBS OF DIFFERENT COMPOSITIONS
Filed May 10, 1939     2 Sheets-Sheet 1
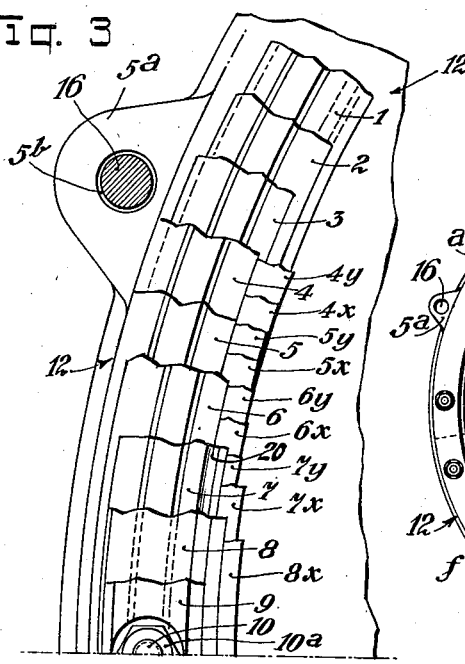
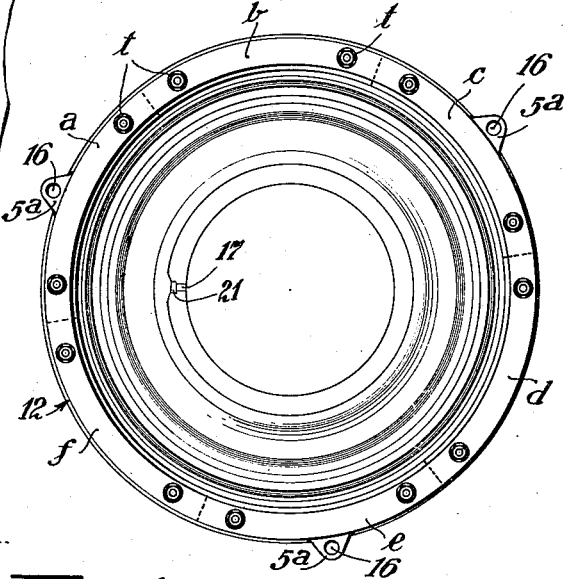
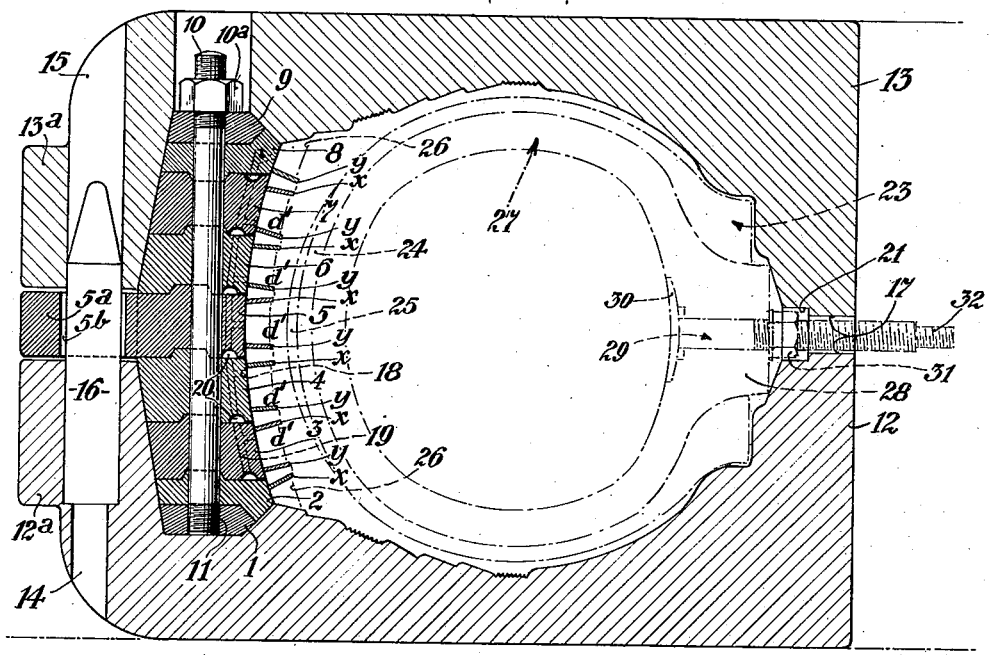
INVENTOR.
Max C. Overman
BY
John W. Hoag
ATTORNEY Sept. 2, 1941.　　　M. C. OVERMAN　　　2,254,622
METHOD FOR FORMING TIRES WITH RIBS OF DIFFERENT COMPOSITIONS
Filed May 10, 1939　　　2 Sheets-Sheet 2
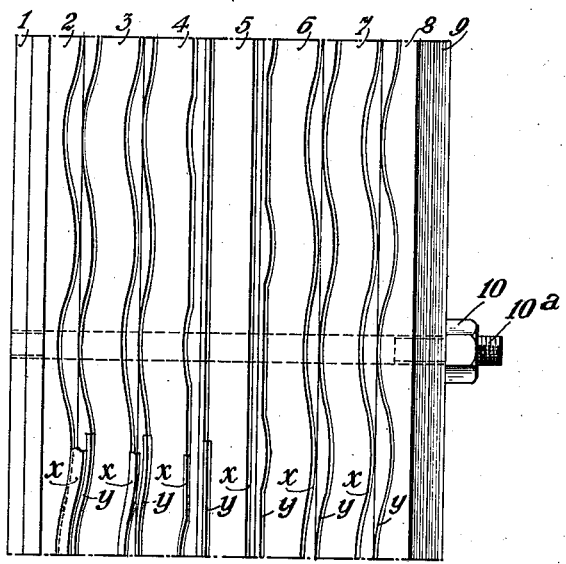
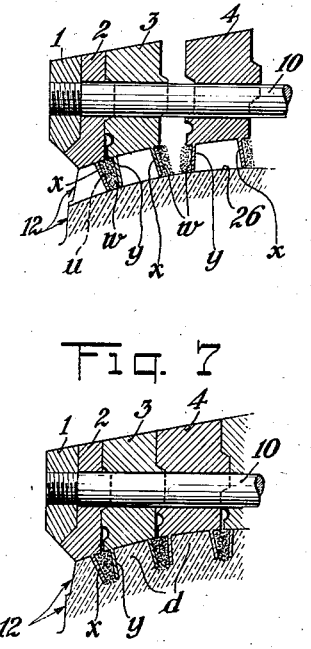
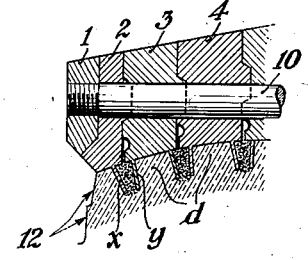
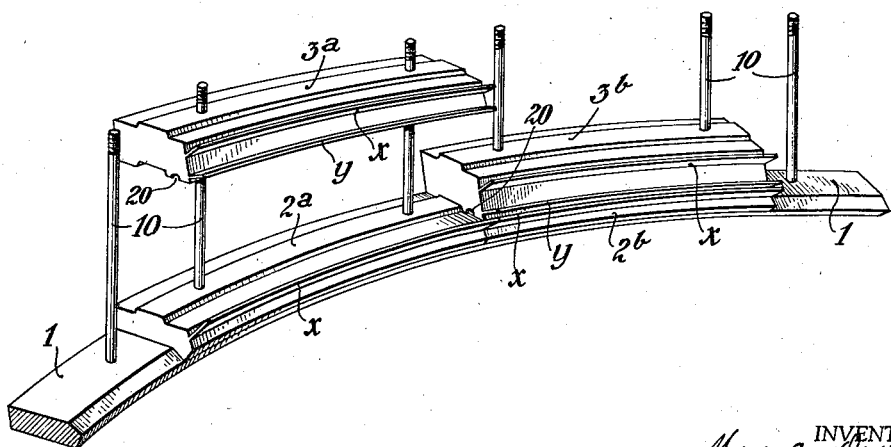
INVENTOR.
Max C. Overman
BY
John N. Hoag
ATTORNEY.

Patented Sept. 2, 1941

2,254,622

UNITED STATES PATENT OFFICE 2,254,622

METHOD FOR FORMING TIRES WITH RIBS OF DIFFERENT COMPOSITIONS

Max C. Overman, New York, N. Y.

Application May 10, 1939, Serial No. 272,826

4 Claims. (Cl. 18—59)

This invention relates to a tire mold structure and to a method of forming the ribs of a tire.

In my co-pending application Serial No. 248,-185, I disclose an improved form of tire having circumferentially extending ribs which are alternately draft and undercut in cross section. Besides the advantage of being substantially self closing this structure lends itself to a pleasing and novel color effect which I have originated and obtained by forming the undercut ribs of white rubber while forming the draft ribs as before of the black composition of the tire tread.

I have found that no tire molds are available for making a tread with alternate draft and undercut ribs and as far as I am aware a mold structure capable of forming my improved rib structure is broadly new.

In carrying out my invention I provide a tread rib mold comprising a number of annular parts, divided into a number of circumferential sections and having inwardly projecting rib spacing members. The annular parts of the tread rib mold assembly are secured together by detachable means such as nuts and bolts which preferably extend between annular support members provided on either side of the assembled annular mold members. The sections of the latter are detachably secured in the assembly so that each may be released and removed independently of other sections. The assembled tread rib mold may be mounted in a tire mold in position to engage the periphery of the tread of an unvulcanized tire.

Although the rib spacing members illustrated herein are inclined to one another to form alternate draft and undercut rib forming spaces they are distributed between the annular mold parts in such a way that ribs inclined toward one another are not carried by the same annular part. Thus the sections of rib spacing members carried by the sections of the annular tread rib mold parts will not prevent any section of said annular parts from being readily separated from the vulcanized tire.

Since in assembling my rib mold structure some of the rib forming spaces may be readily filled with a special rubber composition, my mold structure lends itself particularly to the formation of a tread structure having ribs some of which are different in composition, in color or otherwise, from the other ribs.

The invention will best be understood if the following description is read in connection with the accompanying drawings in which:

Figure 1 is a transverse section through the tire mold assembly;

Figure 2 shows the rib mold assembly lying on one side as viewed from above;

Figure 3 is a detail view of a portion of the structure shown in Figure 2 showing how the parts of the tread rib mold are superimposed one upon the other;

Figure 4 is a plan view of the mold surface of the rib mold assembly;

Figure 5 is a detail perspective view showing the sections of the annular tread rib mold members being assembled upon the clamping bolts;

Figure 6 is a detail cross sectional view showing the parts of the rib mold being assembled, and one manner of applying rubber composition to fill the alternate, undercut rib forming spaces; and Figure 7 is a detail view showing how the draft ribs are formed in the spaces between the undercut ribs.

The rib mold consists of the annular support members 1 and 9 and the intermediate annular mold members 2, 3, 4, 5, 6, 7, and 8. Each of the mold members 3, 4, 5, 6, and 7 has projecting inwardly from its inner periphery two rib spacing members, $x$ and $y$, which constitute the side walls of the individual rib forming mold spaces. The rib spacing members carried by each of the mold members 3, 4, 5, 6, and 7 are inclined outwardly from each other thus forming between themselves mold spaces $d$ adapted to shape draft ribs. It will be noted, however, that each rib spacing member of one annular mold member is inclined inwardly toward the nearest rib spacing member carried by the abutting annular mold members thus forming spaces $u$ adapted to shape ribs which are undercut in cross section, i. e. wider at the tread surface than at the base.

Annular mold members 2 and 8 are provided with only one rib spacing member each, $x$ and $y$ respectively. They are inclined toward the nearest rib of the abutting mold members together with which they provide undercut rib forming spaces, completing the alternate arrangement of draft and undercut rib forming spaces.

The support members 1 and 9 are preferably continuous unitary members whereas the mold members 2 to 8 inclusive are divided circumferentially into a number of sections. As illustrated, (Fig. 2) they are divided into six sections $a, b, c, d, e, f$. Each section is provided with two transverse bores $t$ to receive a locking bolt and the support member 9 is correspondingly bored at similar distances. The support member 1, as illustrated, is provided with a central bore 11 in its inner face which is internally threaded to receive one end of bolt 10. In assembling the rib mold, bolts 10 may first be seated in bores 11 of the support 1, after which the sections of mold member 2 are positioned by inserting the free ends of bolts 10 in the bores t and lowering the sections of member 2 until they are superimposed upon support member 1, as indicated in Figure 5. The sections of annular mold member 3 are then assembled in the same way and so on until the assembly is complete.

The sections of the mold members may be disassembled from the vulcanized tire in the same manner, by first removing the retaining nuts 10a from bolts 10 and then first separating the sections of mold member 8 from the assembly, followed by the sections of mold member 7, and so on. Since no section of any of the mold members carries sections of rib spacing members which are inclined toward one another, each section may be readily separated from the vulcanized tire.

Where it is desired to fill some of the rib forming spaces with a rib forming composition different in color or in other respects from that used for forming the other ribs it will be convenient to fill the rib spaces which are to receive one kind of rib forming composition while the rib mold is being assembled. This may be accomplished by depositing some of the desired composition on the opposing faces of said rib spacing members before they are assembled in abutting relationship. In this way the rib spaces to be preliminarily filled will be filled and the material compacted when the adjoining mold members are moved laterally together, without the difficulty which would be encountered in trying to fill the spaces through their open ends. In the drawings (Fig. 6) I have indicated the spaces u for forming undercut ribs as being preliminarily filled with a special composition w, preferably colored white to give a distinctive appearance to the tread of the tire, while the various mold members are being assembled. In Fig. 7 I have shown the spaces d' also filled with the rubber composition from the tread portion of the tire, which is accomplished when the unvulcanized tire is forced against the assembled rib mold surface in a manner well understood by those skilled in this art.

Each of the bolts is provided with a nut 10a to tighten the members 1 to 9 together and secure them in position. The complete tread rib mold assembly is inserted within a tire mold comprising two complementary parts 12 and 13 adapted when brought together to form a closure to receive an unvulcanized tire and shape it while it is being vulcanized. At intervals adjacent their peripheries the tire mold members 12 and 13 are provided in their lip portions 12a and 13a with registering axially extending apertures 14 and 15 to receive dowel pins 16 by which the two tire mold members 12 and 13 may be brought into register and secured together.

As illustrated herein the lip portions 12a and 13a of tire mold members 12 and 13 are formed so that when the tire mold is closed a space will be left between the lip positions sufficient to receive lugs 5a provided at intervals projecting outwardly from the outer periphery of tread rib mold member 5. The lugs 5a are bored at 5b to receive the dowel pins 16. By positioning lugs 5a so that the bores 5b are in register with apertures 14 and 15 the mold members 5, and therefore the whole tread rib mold assembly will be centered and held in place by dowel pins 16. The tire mold members 12 and 13 are shaped interiorly to fit snugly around the tread rib mold assembly, which is thus supported adjacent the inner periphery of the tire mold.

The tire mold members 12 and 13 are formed with registering concavities 21 to receive the valve member 29 attached to the air core 27 by the valve head 30 and provided with nut 31 screw threadedly secured on the exterior of the valve member. Valve 29 extends outwardly through the wall of the tire mold and at its free end has a reduced portion 32 for connection with a source of fluid supply, such for example as the compressed air hose of an hydraulic pot vulcanizer.

In the operation of the invention the tread rib mold is first assembled and then placed in one of the members 12 and 13 comprising the tire mold. An unvulcanized tire or carcass 23 which ordinarily comprises the fabric plies 24, the breaker strip 25, and the tread 26, indicated in broken lines in Figure 1, by way of example, is placed on one side within the concavity provided in the tire mold member, with the periphery of tread surface 26 adjacent the mold surface of the tread rib mold. The air core 27 is then inserted within the tire and, after the tread mold has been closed and dowel pins 16 inserted in place, pressure may be applied to the unvulcanized tire 23, as by admitting fluid under pressure into core tube 27, thereby forcing the tread surface of the unvulcanized surface outwardly against the tread rib mold surface causing the rubber composition from the tread portion 26 to flow into the unfilled spaces provided between the rib spacing members $x$ and $y$. In practice, since the tire mold members 12 and 13 will ordinarily be heated to a high degree when the unvulcanized tire 23 is inserted therein, the rubber composition from the tread portion 26 will tend immediately to flow into the unfilled spaces provided by the rib spacing members $x$ and $y$, and this flow of rubber from the tread portion 26 is increased when pressure is applied to expand the tire outwardly, as by admitting fluid pressure into the core tube 27. The step of vulcanizing takes place of course after the rubber flows into the unfilled spaces from the tread portion 26 between spaces $x$ and $y$. In practice, flow of the rubber composition into the rib forming spaces, and the step of vulcanizing, are performed substantially simultaneously since the step of connecting valve member 29 to a source of fluid pressure and the step of vulcanizing are usually both performed in an hydraulic pot vulcanizer.

To insure tight fitting of annular rib mold members 2 to 8 inclusive these may be given a tongue and groove formation illustrated in Figure 1.

To provide a means for escape of excess rubber composition from the tire forming spaces during the time when the unvulcanized tire is being forced against the tread rib mold surface under pressure, rearwardly extending vents 18 are provided in annular rib mold members 3 to 8 communicating with the circumferentially extending groove 19 which at intervals is provided with concavities or catch-basins 20.

It will be understood that the invention is not limited to the details alone described, but that it comprehends broadly a multi-part tread rib mold, and the method of forming the ribs of a tire, as defined in the claims.

What I claim is:

1. The method of making a tire having ribs of different rubber composition which comprises employing a mold having a number of inwardly extending rib spacing members, initially filling some of the spaces between said spacing members with a special rubber composition, placing an unvulcanized tire within said mold, and forcing rubber composition from the tire tread into the unfilled spaces between said spacing members, vulcanizing the tire, and separating the vulcanized tire from the mold.

2. The method of making a tire having circumferentially extending ribs some of which are colored differently from the others which comprises employing a mold having a number of inwardly extending rib spacing members, preliminarily filling some of the spaces between said spacing members with a rubber composition of a color different from that of the tread portion of an unvulcanized tire, placing an unvulcanized tire within the mold and causing rubber composition from the tread portion to flow into the unfilled spaces between said spacing members, vulcanizing the tire and separating the mold therefrom.

3. The method of making a tire having alternate black, and white ribs, which comprises initially filling alternate annular concavities of a rib mold having a number of circumferentially extending concavities with a white colored composition and thereafter filling the unfilled concavities of the rib mold by forcing the periphery of an unvulcanized tire body against the face of the mold causing black rubber composition from the tread portion of the tire to flow into the said unfilled concavities.

4. The method of making a tire which comprises employing a mold having inwardly projecting circumferentially extending rib spacing members alternately inclined to the normal in opposite directions, filling alternate spaces between said rib spacing members with a selected rubber composition, placing an unvulcanized tire body in said mold, forcing rubber composition from the unvulcanized tire body into the remaining spaces between the rib spacing members and against the rubber composition already in said alternate spaces between the rib spacing members, and vulcanizing the tire.

MAX C. OVERMAN.